United States Patent
Tsuchiya

(10) Patent No.: US 10,551,677 B2
(45) Date of Patent: Feb. 4, 2020

(54) LIQUID CRYSTAL DISPLAY DEVICE AND ELECTRONIC APPARATUS

(71) Applicant: SEIKO EPSON CORPORATION, Tokyo (JP)

(72) Inventor: Yutaka Tsuchiya, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/002,252

(22) Filed: Jun. 7, 2018

(65) Prior Publication Data
US 2018/0364512 A1 Dec. 20, 2018

(30) Foreign Application Priority Data
Jun. 20, 2017 (JP) ................ 2017-120287

(51) Int. Cl.
G02F 1/13363 (2006.01)
G02F 1/1335 (2006.01)
G03B 21/00 (2006.01)

(52) U.S. Cl.
CPC .... G02F 1/13363 (2013.01); G02F 1/133526 (2013.01); *G02F 2413/02* (2013.01); *G02F 2413/06* (2013.01); *G03B 21/006* (2013.01)

(58) Field of Classification Search
CPC .......... G02F 1/13363; G02F 1/133526; G02F 2413/06; G02F 2413/02; G02F 1/1337; G02F 1/133528; G02F 1/133512; G02F 1/136286; G02F 1/133345; G02F 2201/121; G02F 2201/123; G02F 2001/133638; G03B 21/006; G09G 3/3648; G09G 3/3677; G09G 3/3688
See application file for complete search history.

(56) References Cited

U.S. PATENT DOCUMENTS

| | | | |
|---|---|---|---|
| 7,295,264 B2 * | 11/2007 | Kim | H04N 13/31 349/74 |
| 2001/0022562 A1 * | 9/2001 | Ishikawa | G02B 27/2214 345/9 |
| 2005/0111072 A1 | 5/2005 | Miyagaki et al. | |
| 2008/0143893 A1 | 6/2008 | Nakagawa | |
| 2009/0040400 A1 | 2/2009 | Nakagawa et al. | |
| 2010/0328440 A1 * | 12/2010 | Willemsen | G02B 27/2214 348/59 |

(Continued)

FOREIGN PATENT DOCUMENTS

| | | |
|---|---|---|
| JP | 2003-270636 A | 9/2003 |
| JP | 2004-163450 A | 6/2004 |

(Continued)

*Primary Examiner* — Hoan C Nguyen
(74) *Attorney, Agent, or Firm* — Oliff PLC

(57) ABSTRACT

An aspect of a liquid crystal display device includes an element substrate, a counter substrate, and a liquid crystal layer sandwiched by the element substrate and the counter substrate. The counter substrate includes a common electrode, a first lens layer that collects light incident to the counter substrate, a second lens layer that collects the light, and a first phase difference compensation layer that is arranged between the first lens layer and the second lens layer in a thickness direction perpendicular to the common electrode and compensates a phase difference of the light generated by the liquid crystal layer.

19 Claims, 8 Drawing Sheets

(56) References Cited

U.S. PATENT DOCUMENTS

| | | | |
|---|---|---|---|
| 2014/0028933 A1* | 1/2014 | Chen | G02B 27/26 349/15 |
| 2016/0018568 A1 | 1/2016 | Ito et al. | |
| 2016/0241843 A1* | 8/2016 | Zhou | G02B 27/2264 |

FOREIGN PATENT DOCUMENTS

| | | |
|---|---|---|
| JP | 2005-181965 A | 7/2005 |
| JP | 2008-545149 A | 12/2008 |
| JP | 2010-217360 A | 9/2010 |
| JP | 2016-024207 A | 2/2016 |

* cited by examiner

LIQUID CRYSTAL DISPLAY DEVICE AND ELECTRONIC APPARATUS

BACKGROUND

1. Technical Field

The present invention relates to a liquid crystal display device and an electronic apparatus.

2. Related Art

In a liquid crystal display device that is used as a light valve of a projector, a plurality of pixels are arranged in a matrix form in a display area. In each pixel, an opening region surrounded by a light shielding layer formed with wiring or the like transmits light. A lens layer (micro lenses) can be provided in a counter substrate in order to collect light into the opening region and transmit the light efficiently.

As high-definition of a liquid crystal display device progresses, a pixel pitch reduces, so that the opening region of a pixel becomes small. As described in JP-A-2016-24207, it is possible to improve collecting performance of light to the opening region by providing a plurality of lens layers to the counter substrate.

In a liquid crystal display device, a liquid crystal layer has optical anisotropy, so that a phase difference may occur in light that transmits through the liquid crystal layer. It is possible to compensate such a phase difference by a phase difference compensation member such as a C plate. In a technique described in JP-T-2008-515149, a phase difference compensation layer is provided between a microlens array substrate and a liquid crystal layer and on a light-source-side surface of a counter substrate.

By the way, when the pixel pitch becomes small as the high-definition progresses, the size of the counter substrate in a thickness direction also becomes small. As described later in detail, according to study by the inventors, it is found that when the size of the counter substrate in the thickness direction becomes small, it becomes difficult to arrange the phase difference compensation member in the counter substrate.

SUMMARY

An advantage of some aspects of the invention is to provide a technique for arranging a phase difference compensation member in a counter substrate including a plurality of lens layers in a liquid crystal display device.

An aspect of a liquid crystal display device according to the invention includes an element substrate, a counter substrate, and a liquid crystal layer sandwiched by the element substrate and the counter substrate. The counter substrate includes a common electrode, a first lens layer that collects light incident to the counter substrate, a second lens layer that collects the light, and a first phase difference compensation layer that is arranged between the first lens layer and the second lens layer in a thickness direction perpendicular to the common electrode and compensates a phase difference of the light generated by the liquid crystal layer.

According to the aspect described above, at least the first phase difference compensation layer is arranged between the first lens layer and the second lens layer as the phase difference compensation member, so that even when it is difficult to secure a space for arranging the phase difference compensation member between one of the first lens layer and the second lens layer, which is arranged closer to the liquid crystal layer, and the liquid crystal layer, the phase difference compensation member can be arranged in the counter substrate and it is possible to compensate a phase difference of light generated by the liquid crystal layer.

In the aspect of the liquid crystal display device described above, the counter substrate includes a first light-transmitting layer arranged between the first phase difference compensation layer and the first lens layer in the thickness direction. According to this aspect, it is easy to adjust a thickness of a layer through which light transmits between the first lens layer and the second lens layer by adjusting a thickness of the first light-transmitting layer.

In the aspect of the liquid crystal display device described above, the counter substrate includes a second light-transmitting layer arranged between the first phase difference compensation layer and the second lens layer in the thickness direction. According to this aspect, it is easy to adjust a thickness of a layer through which light transmits between the first lens layer and the second lens layer by adjusting a thickness of the second light-transmitting layer.

In the aspect of the liquid crystal display device described above, the first phase difference compensation layer is in contact with the first lens layer. According to this aspect, as compared with a case where another layer exists between the first phase difference compensation layer and the first lens layer, it is possible to more suppress reflection at an interface between the other layer and the first phase difference compensation layer and reflection at an interface between the other layer and the first lens layer.

In the aspect of the liquid crystal display device described above, the first phase difference compensation layer is in contact with the second lens layer. According to this aspect, as compared with a case where another layer exists between the first phase difference compensation layer and the second lens layer, it is possible to more suppress reflection at an interface between the other layer and the first phase difference compensation layer and reflection at an interface between the other layer and the second lens layer.

In the aspect of the liquid crystal display device described above, the counter substrate includes a second phase difference compensation layer that is arranged between one of the first lens layer and the second lens layer, which is arranged closer to the liquid crystal layer, and the liquid crystal layer, and compensates the phase difference of the light. According to this aspect, the second phase difference compensation layer is arranged so that the first lens layer and the second lens layer do not exist between the liquid crystal layer and the second phase difference compensation layer, so that the phase difference can be easily compensated.

In the aspect of the liquid crystal display device described above, a thickness of the second phase difference compensation layer is greater than or equal to a thickness of the first phase difference compensation layer. According to this aspect, the phase difference can be more easily compensated as compared with a case where the second phase difference compensation layer is thinner than the first phase difference compensation layer.

In the aspect of the liquid crystal display device described above, a thickness of the second phase difference compensation layer is smaller than or equal to a thickness of the first phase difference compensation layer. According to this aspect, even when it is rather difficult to secure a space for arranging the phase difference compensation member between one of the first lens layer and the second lens layer, which is arranged closer to the liquid crystal layer, and the liquid crystal layer, the phase difference compensation member can be easily arranged in the counter substrate.

An aspect of an electronic apparatus according to the invention includes the liquid crystal display device described above.

According to the aspect described above, in the liquid crystal display device included in the electronic apparatus, the phase difference compensation member can be arranged in the counter substrate and it is possible to compensate a phase difference of light generated by the liquid crystal layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings and the like. However, in each drawing, the dimension and scale of each portion are appropriately differentiated from the actual one. The embodiments described below are preferred specific examples of the invention, so that technically preferred various limitations are made. However, the scope of the invention is not limited to these embodiments as long as there is no statement that limits the invention in the description below.

First Embodiment

As an embodiment of the invention, an active matrix type liquid crystal display device 100 is exemplified which includes thin film transistors (TFTs) as pixel switching elements.

Figure 1:
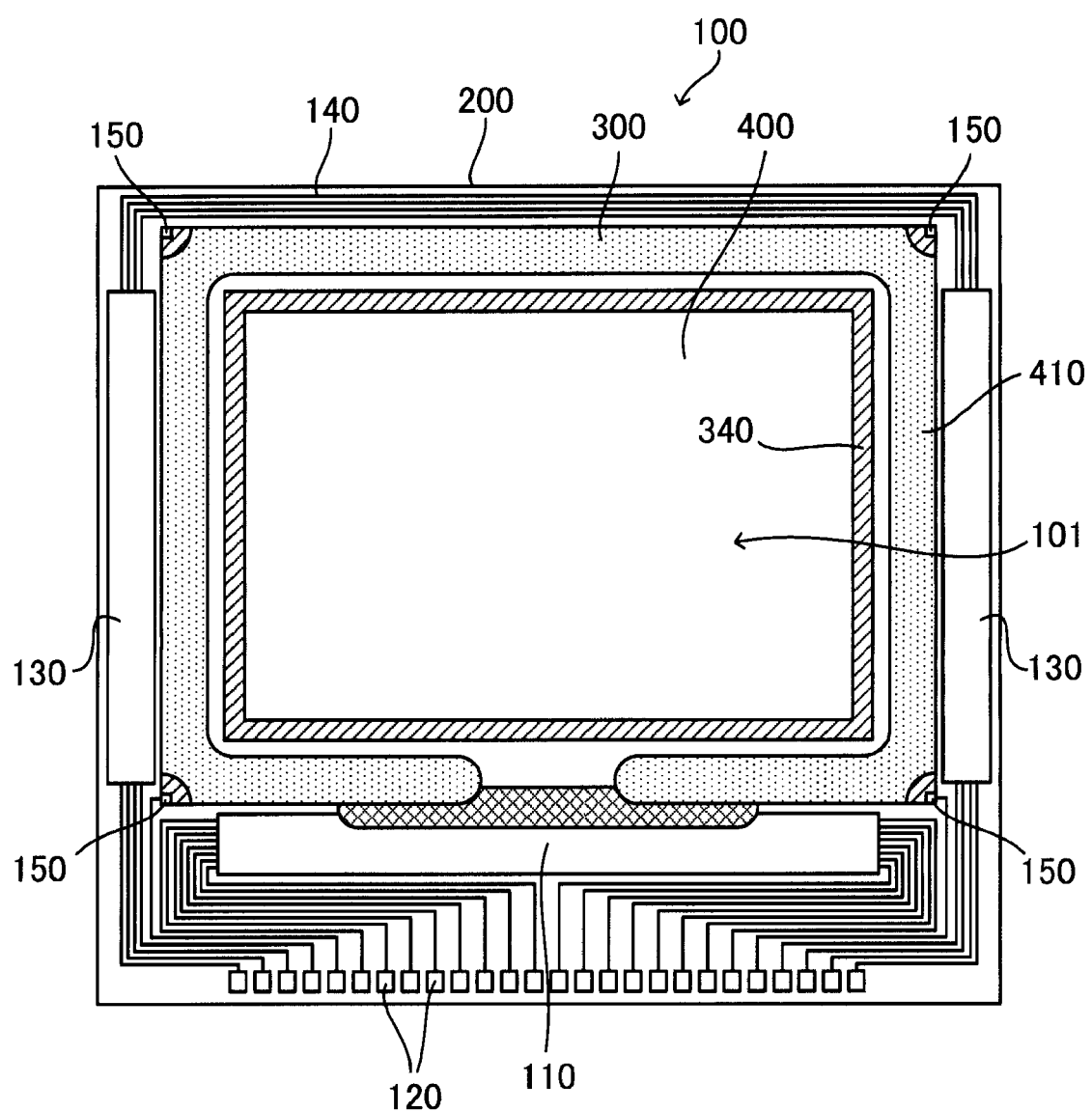
FIG. 1 is a schematic plan view showing a configuration of a liquid crystal display device according to an embodiment.

FIG. 1 is a schematic plan view illustrating an entire configuration of the liquid crystal display device 100. The liquid crystal display device 100 includes an element substrate 200, a counter substrate 300 arranged opposed to the element substrate 200, and a liquid crystal layer 400 arranged between the element substrate 200 and the counter substrate 300.

The element substrate 200 and the counter substrate 300 are bonded together via a seal material 410 arranged in a picture frame-like shape. The liquid crystal layer 400 is formed of a liquid crystal having a positive or negative dielectric anisotropy sealed in a space enclosed by the element substrate 200, the counter substrate 300, and the seal material 410.

The seal material 410 is composed of an adhesive agent such as, for example, a thermosetting or ultraviolet curable epoxy resin. The seal material 410 is mixed with a spacer for maintaining a constant gap between the element substrate 200 and the counter substrate 300. A peripheral breaking part 340 composed of a light shielding material is formed inside a formation region of the seal material 410. Inside of the peripheral breaking part 340 is a display area 101 where a plurality of pixels are arranged.

In a region outside the seal material 410, a data line drive circuit 110 and external circuit mounting terminals 120 are provided along a side of the element substrate 200, and a scan line drive circuit 130 is provided along two sides adjacent to the side. Along the remaining side of the element substrate 200, a plurality of wiring lines for connecting between the scan line drive circuits 130 on both sides. An inter-substrate conductive material 150 for electrically conducting between the element substrate 200 and the counter substrate 300 is provided at corner portions of the counter substrate 300.

For example, the liquid crystal display device 100 operates in a TN (Twisted Nematic) mode or a VA (Vertical Alignment) mode. The liquid crystal display device 100 is used as, for example, a transmission-type display device that modulates light incident from the side of the counter substrate 300 and emits the modulated light to the side of the element substrate 200.

Figure 2:
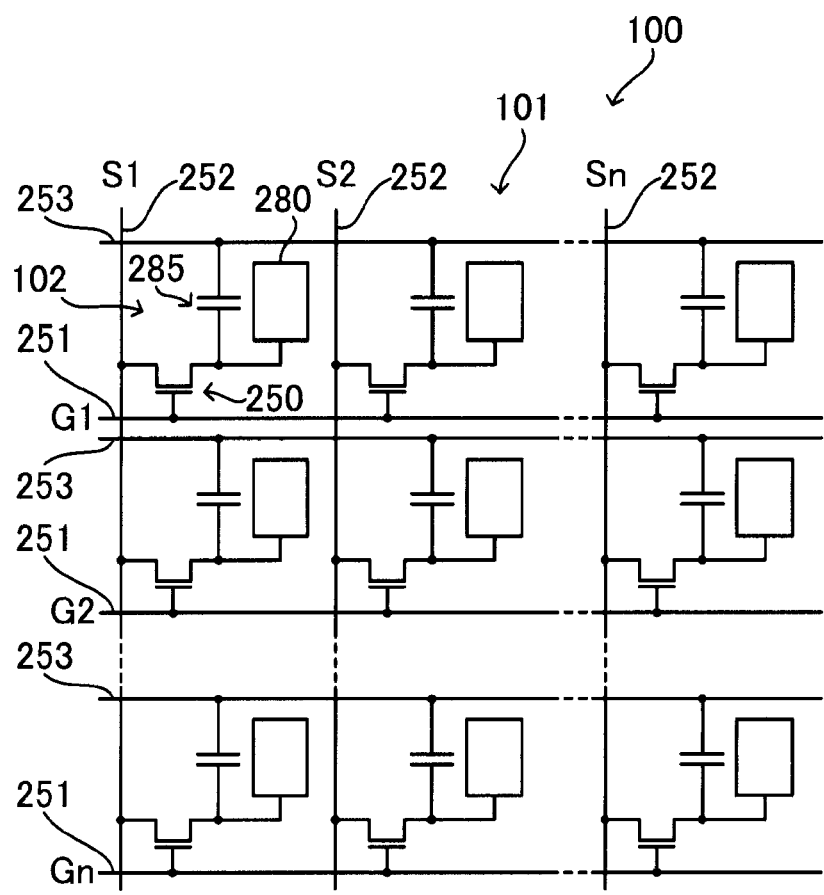
FIG. 2 is an equivalent circuit diagram showing an electric configuration of the liquid crystal display device according to the embodiment.

FIG. 2 is an equivalent circuit diagram illustrating an electric configuration of the liquid crystal display device 100. A plurality of pixels 102 are arranged in a matrix form in the display area 101. Each pixel is provided with a pixel electrode 280 and a TFT 250. The source electrode of the TFT 250 is electrically connected with a data line 252 extended from the data line drive circuit 110. The data line 252 is line-sequentially supplied with image signals (data signals) S1, S2, ..., and Sn from the data line drive circuit 110. The gate electrode of the TFT 250 is electrically connected with a scan line 251 extended from the scan line drive circuit 130. The scan line 251 is line-sequentially supplied with scan signals G1, G2, ..., and Gn from the scan line drive circuit 130. The drain electrode of the TFT 250 is electrically connected with a pixel electrode 280.

When the TFT 250 is turned ON for a certain period of time, the image signals S1, S2, ..., and Sn are written to the pixel electrode 280 through the data line 252 at a predetermined timing. The image signal of a predetermined level that is written to the liquid crystal layer 400 through the pixel electrode 280 in this way is held for a certain period of time by a liquid crystal capacitor formed between the liquid crystal layer 400 and a common electrode 380 (see FIG. 3) provided to the counter substrate 300.

To prevent the held image signals S1, S2, . . . , and Sn from leaking, a storage capacitor 285 is formed between the pixel electrode 280 and a capacitor line 253, and the storage capacitor 285 is arranged in parallel with the liquid crystal capacitor. In this way, a voltage signal is applied to a liquid crystal of each pixel 102 and an alignment state of the liquid crystal changes according to a level of the applied voltage, so that light incident to the liquid crystal layer 400 is modulated and a gradation display becomes possible.

Figure 3:
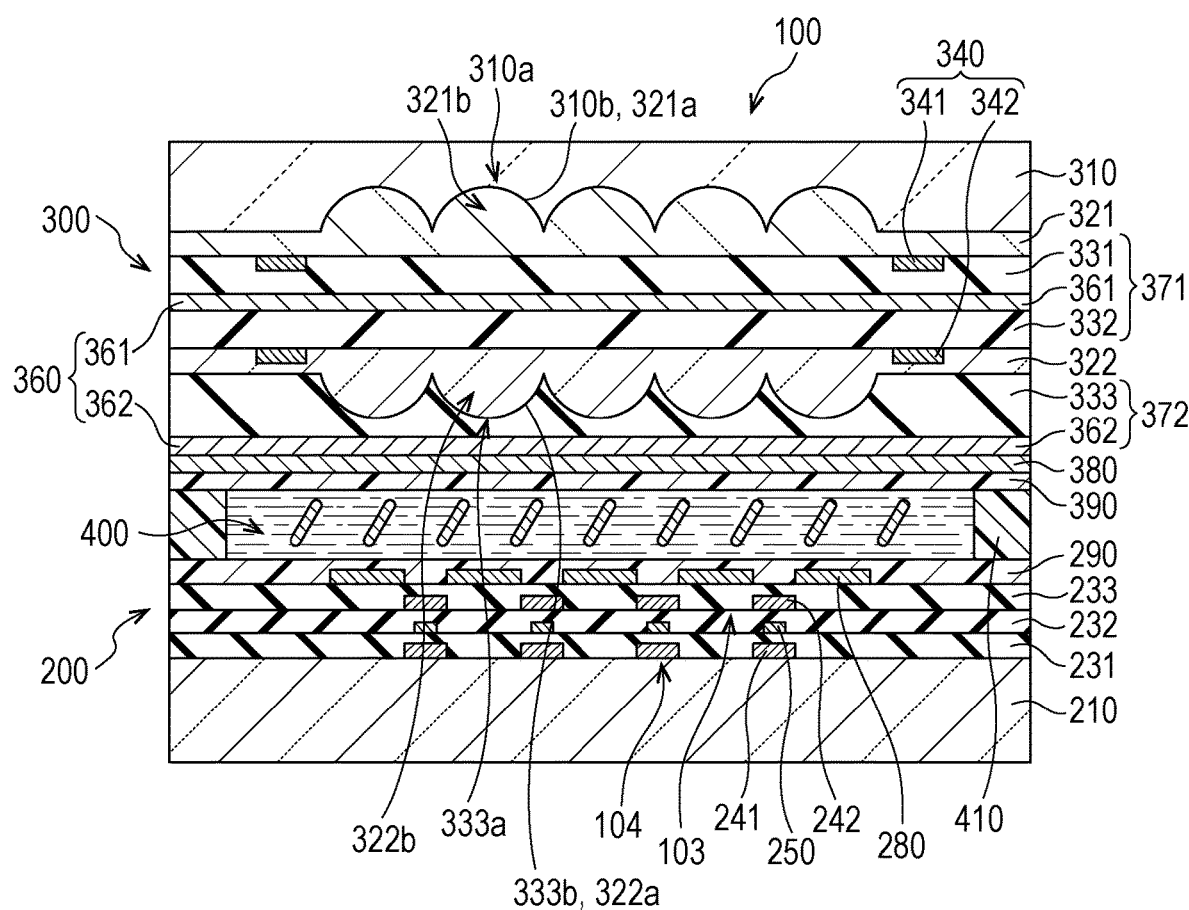
FIG. 3 is a schematic cross-sectional view showing a configuration of the liquid crystal display device according to the embodiment.

FIG. 3 is a schematic cross-sectional view illustrating a configuration of the liquid crystal display device 100. A direction perpendicular to the common electrode 380 of the counter substrate 300 (a direction perpendicular to a surface of the common electrode 380 facing the liquid crystal layer 400) is referred to as a thickness direction. Seeing the liquid crystal display device 100 from the thickness direction is referred to as plan view.

In description related to a structure of the liquid crystal display device 100, in the thickness direction, a side of the element substrate 200 facing the liquid crystal layer 400 is referred to as an upper side, and a side of the counter substrate 300 opposite to the liquid crystal layer 400 is referred to as an upper side. However, in description related to a manufacturing process of the liquid crystal display device 100, a side of the counter substrate 300 facing to the liquid crystal layer 400 is referred to as an upper side. This is because in a manufacturing process of the counter substrate 300, members from a lens layer 321 to an alignment film 390 are sequentially stacked on a base material 310.

The element substrate 200 includes a base material 210, an insulating layer 231, an insulating layer 232, an insulating layer 233, a light shielding layer 241, a light shielding layer 242, the TFTs 250, the pixel electrodes 280, and an alignment film 290. The base material 210 is formed of a light transmitting material, such as, for example, quartz or the like, which transmits visible light. The light shielding layer 241 is provided on the base material 210. The light shielding layer 241 is formed of a light shielding material, such as, for example, polysilicon, metal, metal silicide, metal compound, or the like, which shields visible light. The light shielding layer 242 can also be formed of the same materials as those of the light shielding layer 241.

The insulating layer 231 is provided on the base material 210 so as to cover the light shielding layer 241. The insulating layer 231 is formed of an insulating and light transmitting material, such as, for example, silicon oxide. The insulating layer 232 and the insulating layer 233 can also be formed of the same material as that of the insulating layer 231.

The TFT 250 is provided on the insulating layer 231. The TFT 250 has a semiconductor layer and includes a source region, a channel region, and a drain region of the transistor on the semiconductor layer. The insulating layer 232 is provided on the insulating layer 231 so as to cover the TFT 250. The light shielding layer 242 is provided on the insulating layer 232. The insulating layer 233 is provided on the insulating layer 232 so as to cover the light shielding layer 242.

The pixel electrode 280 is provided on the insulating layer 233. The pixel electrode 280 is formed of a conductive and light transmissive material, such as, for example, ITO (Indium Tin Oxide), IZO (Indium Zinc Oxide), or the like. The alignment film 290 is provided on the insulating layer 233 so as to cover the pixel electrode 280. The alignment film 290 is formed of, for example, polyimide, silicon oxide, or the like.

In plan view, the light shielding layer 241 and the light shielding layer 242 overlap with each other, and the light shielding layers 241 and the light shielding layers 242 are provided along edges of each pixel electrode 280 so as to surround each pixel electrode 280. As each of the light shielding layer 241 and the light shielding layer 242, for example, it is possible to use the scan line 251 or the data line 252. A region surrounded by the light shielding layers 241 and the light shielding layers 242 is an opening region (light transmitting region) 103 where light transmits in each pixel 102.

A region where the light shielding layers 241 and the light shielding layers 242 are provided is a non-opening region (light shielding region) 104 where light does not transmit. The TFT 250 is provided in the non-opening region 104 so as to be sandwiched between the light shielding layers 241 and the light shielding layers 242 in the thickness direction.

The counter substrate 300 includes an alignment film 390, a common electrode 380, a phase difference compensation layer 362, an insulating layer 333, a lens layer (micro lenses) 322, a light shielding layer 342, an insulating layer 332, a phase difference compensation layer 361, an insulating layer 331, a light shielding layer 341, a lens layer (micro lenses) 321, and a base material 310. Hereinafter, phase difference compensation that compensates a phase difference of light generated by the liquid crystal layer 400 may be simply referred to as compensation.

The alignment film 390 is formed of, for example, polyimide, silicon oxide, or the like. The common electrode 380 is provided on the alignment film 390. The common electrode 380 is formed of a conductive and light transmissive material, such as, for example, ITO, IZO, or the like. The compensation layer 362 (second phase difference compensation layer) is provided on the common electrode 380. Details of the compensation layer 362 will be described later.

The insulating layer 333 (light-transmitting layer) 333 is provided on the compensation layer 362. The insulating layer 333 is formed of an insulating and light transmitting material, such as, for example, silicon oxide with a refractive index of 1.5. The upper surface of the insulating layer 333 has a concave portion 333a. The concave portion 333a is provided for each pixel electrode 280 of the element substrate 200, that is, for each pixel 102.

The lens layer 322 (first lens layer) is provided on the insulating layer 333 so as to fill the concave portion 333a. The lens layer 322 is formed of a light transmitting material, whose refractive index with respect to visible light is higher than that of the material that forms the insulating layer 333, such as, for example, silicon oxynitride with a refractive index of 1.6.

The concave portion 333a of the insulating layer 333 has a curved surface 333b. The curved surface 333b is a downward convex (convex toward the liquid crystal layer 400) curved surface. The shape of the curved surface 333b may be spherical or may be non-spherical. The lens layer 322 is in contact with the insulating layer 333 on a lens surface 322a which is an interface (interface of curved surface) having a shape of the curved surface 333b. In other words, the lens layer 322 has a lens portion 322b that protrudes downward (toward the liquid crystal layer 400) so as to form the lens surface 322a. The lens surface 322a has a lens effect of collecting light. The upper surface of the lens layer 322 is flat.

The insulating layer 332 (first light-transmitting layer) is provided on the lens layer 322. The insulating layer 332 is formed of an insulating and light transmitting material, such as, for example, silicon oxide with a refractive index of 1.5. The light shielding layer 342 is provided between the lens layer 322 and the insulating layer 332. The light shielding layer 342 is formed of a light shielding material, such as, for example, polysilicon, metal, metal silicide, metal compound, or the like, which shields visible light. The light shielding layer 341 can also be formed of the same materials as those of the light shielding layer 342.

The compensation layer 361 (first phase difference compensation layer) is provided on the insulating layer 332. Details of the compensation layer 361 will be described later. The insulating layer 331 is formed of an insulating and light transmitting material, such as, for example, silicon oxide with a refractive index of 1.5.

The lens layer 321 (second lens layer) is provided on the insulating layer 331. The lens layer 321 is formed of a light transmitting material, whose refractive index with respect to visible light is higher than that of the material that forms the base material 310, such as, for example, silicon oxynitride with a refractive index of 1.6. The light shielding layer 341 is provided between the insulating layer 331 and the lens layer 321. The light shielding layer 342 and the light shielding layer 341 are provided to be overlapped with each other in plan view and form the peripheral breaking part 340.

The base material 310 is provided on the lens layer 321. The base material 310 is formed of a light transmitting material, such as, for example, quartz with a refractive index of 1.5. The lower surface of the base material 310 has a concave portion 310a. The concave portion 310a is provided for each pixel electrode 280 of the element substrate 200, that is, for each pixel 102. The lens layer 321 is provided under the base material 310 so as to fill the concave portion 310a.

The concave portion 310a of the base material 310 has a curved surface 310b. The curved surface 310b is an upward convex (convex toward opposite to the liquid crystal layer 400) curved surface. The shape of the curved surface 310b may be spherical or may be non-spherical. The lens layer 321 is in contact with the base material 310 on a lens surface 321a which is an interface (interface of curved surface) having a shape of the curved surface 310b. In other words, the lens layer 321 has a lens portion 321b that protrudes upward (toward opposite to the liquid crystal layer 400) so as to form the lens surface 321a. The lens surface 321a has a lens effect of collecting light. The lower surface of the lens layer 321 is flat.

A case where light is made incident from the counter substrate 300 to the liquid crystal display device 100 is considered. The light incident into the counter substrate 300 is condensed by the lens surface 321a and the lens surface 322a, that is, by the lens layer 321 and the lens layer 322, transmits through the liquid crystal layer 400, and enters the element substrate 200. The light is condensed by the lens layer 321 and the lens layer 322, so that it is possible to efficiently cause the light to enter the opening region 103.

The lens layer 321 and the lens layer 322 are provided, that is, two lens layers are provided, so that the refractive power increases as compared with a case where one lens layer of only the lens layer 321 or only the lens layer 322 is provided. Therefore, it is possible to efficiently cause the light to enter the opening region 103.

A laminated layer of the insulating layer 331, the compensation layer 361, and the insulating layer 332, which are provided between the lens layer 321 and the lens layer 322 in the thickness direction, forms an optical path length adjusting layer 371 that is a layer through which light transmits between the lens layer 321 and the lens layer 322. A laminated layer of the insulating layer 333 and the compensation layer 362, which are provided between the lens layer 322 and the common electrode 380 in the thickness direction, forms an optical path length adjusting layer 372 that is a layer through which light transmits between the lens layer 322 and the common electrode 380. It is possible to enhance transmittance of light passing through the liquid crystal display device 100 by adjusting each of the thickness of the optical path length adjusting layer 371 and of the thickness of the optical path length adjusting layer 372.

The liquid crystal layer 400 has an optical anisotropy, so that a phase difference may occur in the light passing through the liquid crystal layer 400. Each of the compensation layer 361 and the compensation layer 362 is a member that compensates a phase difference of light generated by the liquid crystal layer 400. A compensation member 360 composed of the compensation layer 361 and the compensation layer 362 is provided in the counter substrate 300, so that it is possible to compensate the phase difference of light generated by the liquid crystal layer 400.

The manufacturing process of the liquid crystal display device 100 will be described. The counter substrate 300 can be manufactured by, for example, applying a technique described in JP-A-2016-24207. Specifically, the counter substrate 300 is manufactured as described below.

A flat plate-shaped member made of quartz, which will be the base material 310, is prepared. A mask having an opening at a central portion of the concave portion 310a, that is, a deepest portion of the concave portion 310a, is formed on the flat plate-shaped member. The concave portion 310a is formed by etching an upper surface of the flat plate-shaped member by, for example, isotropic etching using etching liquid containing hydrofluoric acid. Thereafter, the mask is removed.

The lens layer 321 is formed by depositing silicon oxynitride on the base material 310 so as to fill the concave portion 310a by, for example, plasma enhanced chemical vapor deposition (CVD) and flattening an upper surface of the silicon oxynitride by chemical mechanical polishing (CMP). The light shielding layer 341 is formed by depositing metal or metal compound on the lens layer 321 by, for example, sputtering or vapor deposition and performing patterning.

The insulating layer 331 is formed by, for example, depositing silicon oxide with a thickness of about 5 μm on the lens layer 321 by plasma CVD so as to cover the light shielding layer 341. Next, the compensation layer 361 is formed on the insulating layer 331.

The compensation layer 361 is, for example, a C plate. The compensation layer 361 is formed by alternately laminating high refractive index layers and low refractive index layers. The high refractive index layer is formed of niobium oxide with a refractive index of 2.3, and the thickness of one layer is 20 nm. The low refractive index layer is formed of silicon oxide with a refractive index of 1.5, and the thickness of one layer is 20 nm. For example, the compensation layer 361 with a total thickness of about 0.5 μm is formed by alternately laminating 12 or 13 high refractive index layers and 12 or 13 low refractive index layers by sputtering or vapor deposition.

The insulating layer 332 is formed by, for example, depositing silicon oxide with a thickness of about 4.5 μm on the compensation layer 361 by plasma CVD. The thickness of the optical path length adjusting layer 371 formed as a laminated layer of the compensation layer 361 and the insulating layer 332 is, for example, about 10 µm.

A layer of the compensation layer 361, which is in contact with the insulating layer 331, may be the high refractive index layer or may be the low refractive index layer as needed. A layer of the compensation layer 361, which is in contact with the insulating layer 332, may be the high refractive index layer or may be the low refractive index layer as needed.

The light shielding layer 342 is formed by depositing metal or metal compound on the insulating layer 332 by, for example, sputtering or vapor deposition and performing patterning. Silicon oxynitride is deposited on the insulating layer 332 by, for example, plasma CVD so as to cover the light shielding layer 342. A mask having a convex shape corresponding to the lens portion 322b is formed on this silicon oxynitride film by using a photosensitive resin. Then, the lens layer 322 is formed by transferring the convex shape of the mask to the silicon oxynitride film by anisotropic dry etching using an induction coupled plasma device or the like.

The insulating layer 333 is formed by, for example, depositing silicon oxide by plasma CVD and flattening an upper surface by CMP. The CMP is performed so that the thickness of the thinnest portion of the insulating layer 333 (CMP residual thickness), which is a thickness from a top portion of the lens portion 322b to the upper surface of the insulating layer 333, becomes, for example, about 2.0 µm.

The compensation layer 362 is formed on the insulating layer 333. The compensation layer 362 is, for example, a C plate and is formed in the same manner as the compensation layer 361. For example, the compensation layer 362 with a total thickness of about 0.5 µm is formed by alternately laminating 12 or 13 high refractive index layers and 12 or 13 low refractive index layers by sputtering or vapor deposition. The thickness (the thickness of the thinnest portion) of the optical path length adjusting layer 372 formed as a laminated layer of the insulating layer 333 and the compensation layer 362 is, for example, about 2.5 µm.

The common electrode 380 is formed by depositing ITO on the compensation layer 362 by, for example, sputtering. A layer of the compensation layer 362, which is in contact with the insulating layer 333, may be the high refractive index layer or may be the low refractive index layer as needed. A layer of the compensation layer 362, which is in contact with the common electrode 380, may be the high refractive index layer or may be the low refractive index layer as needed. For example, the layer which is in contact with the common electrode 380 may be the low refractive index layer so that an interface with the common electrode 380 has the same structure as a structure that is normally often used (a structure where the silicon oxide and the ITO are in contact with each other.

The alignment film 390 is formed on the common electrode 380. In this way, the counter substrate 300 is manufactured. The element substrate 200 can be manufactured by appropriately using publicly known techniques. The liquid crystal layer 400 can be formed between the element substrate 200 and the counter substrate 300 by appropriately using publicly known techniques. In this way, the liquid crystal display device 100 is manufactured.

Figure 4:
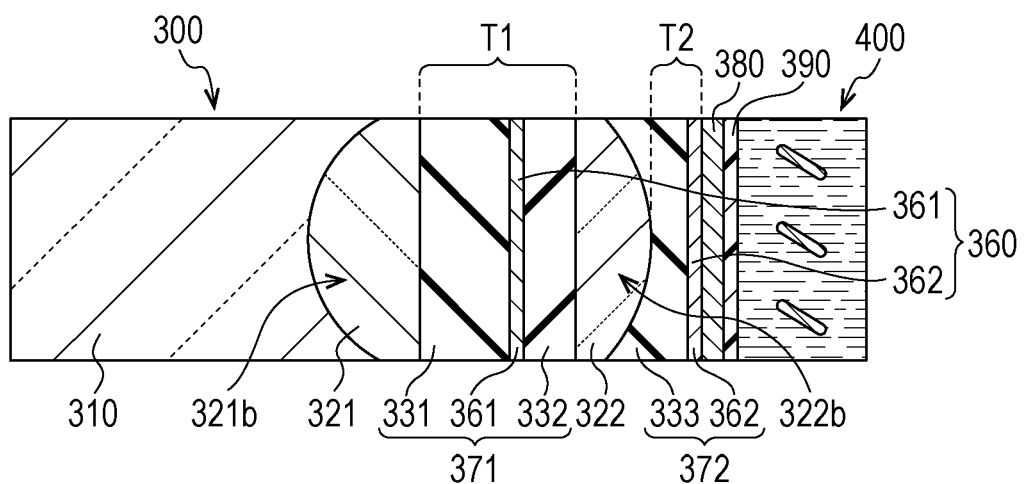
FIG. 4 is a schematic cross-sectional view showing a configuration of one pixel of a counter substrate in a first embodiment.

Hereinafter, the counter substrate 300 will be further described with reference also to FIG. 4. FIG. 4 is a schematic cross-sectional view showing a configuration of one pixel of the counter substrate 300 in the first embodiment. In FIG. 3, the vertical direction of the page indicates the thickness direction. On the other hand, in FIG. 4, the horizontal direction of the page indicates the thickness direction. In FIG. 4, the right side of the page is an area where the liquid crystal layer 400 is located, and the left side of the page is an area opposite to the area where the liquid crystal layer 400 is located.

Figure 12:
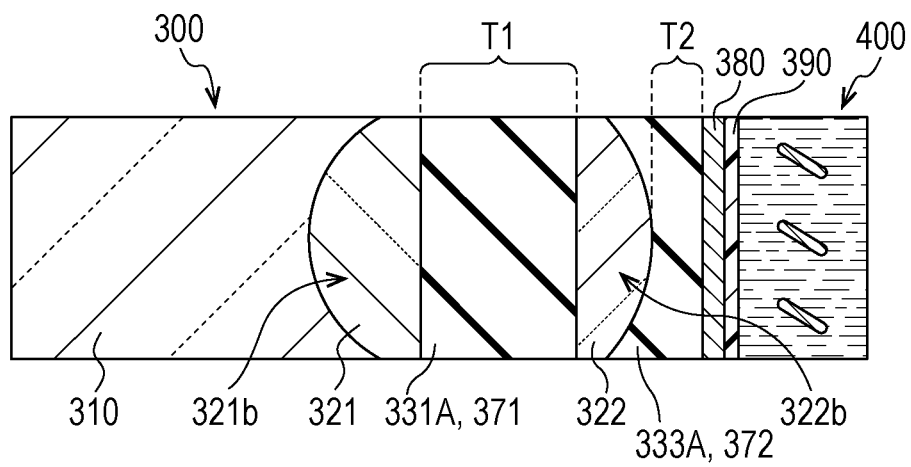
FIG. 12 is a schematic cross-sectional view showing a configuration of one pixel of a counter substrate in a reference form.

Here, first, a reference form will be described. In the reference form, structures and members different from those of the first embodiment are denoted by adding "A" to their reference numerals. FIG. 12 is a schematic cross-sectional view showing a configuration of one pixel of a counter substrate 300 in the reference form.

The counter substrate 300 of the reference form has a configuration where the compensation member 360 is removed from the counter substrate 300 of the first embodiment. In other words, the counter substrate 300 of the first embodiment indicates a preferred aspect when providing (embedding) a compensation member that compensates the phase difference of light generated by the liquid crystal layer 400 in the counter substrate 300 of the reference form.

In the reference form, the compensation layer 361 is omitted, so that an insulating layer 331A provided between the lens layer 321 and the lens layer 322 constitutes the optical path length adjusting layer 371. Further, the compensation layer 362 is omitted, so that an insulating layer 333A provided between the lens layer 322 and the common electrode 380 constitutes the optical path length adjusting layer 372.

The thickness of the optical path length adjusting layer 371 is regulated by the thickness of a thinnest portion (a distance between the lens layer 321 and the lens layer 322 in the thickness direction) T1. The thickness of the optical path length adjusting layer 372 is regulated by the thickness of a thinnest portion (a distance between the lens layer 322 and the common electrode 380 in the thickness direction) T2. Preferred thicknesses of the optical path length adjusting layer 371 and the optical path length adjusting layer 372 for achieving high transmittance may vary due to various conditions. However, in the present description, a preferred thickness T1 of the optical path length adjusting layer 371 is defined as, for example, 10 µm, and a preferred thickness T2 of the optical path length adjusting layer 372 is defined as, for example, 2.5 µm. The preferred thickness T2 of the optical path length adjusting layer 372 tends to be thinner than the preferred thickness T1 of the optical path length adjusting layer 371.

As understood from the manufacturing process described above, the manufacturing process of the optical path length adjusting layer 372 includes a process of flattening the insulating layer formed to cover the lens portion 322b by the CMP. Hereinafter, the insulating layer that has been flattened is referred to as a flattened insulating layer. The flattened insulating layer is the insulating layer 333 in the first embodiment, the insulating layer 333A in the reference form, and an insulating layer 333B in a comparative form described later. When considering an in-plane accuracy of the CMP, to prevent the lens portion 322b from being polished, it is preferable that the thickness of the thinnest portion of the flattened insulating layer (CMP residual thickness) is greater than or equal to a predetermined thickness (for example, 2.0 µm).

Generally, when the pixel pitch becomes small as the liquid crystal display device becomes high-definition, the optical path length adjusting layer becomes thinner at a rate corresponding to a reduction ratio of the pixel pitch. Further, when providing two lens layers in the counter substrate, the number of the optical path length adjusting layers becomes two times the number of the optical path length adjusting layers when one lens layer is provided. Therefore, the thickness of the flattened insulating layer included in the optical path length adjusting layer 372 approaches 2.0 µm as the high definition advances, so that a margin over 2.0 µm decreases.

Figure 13:
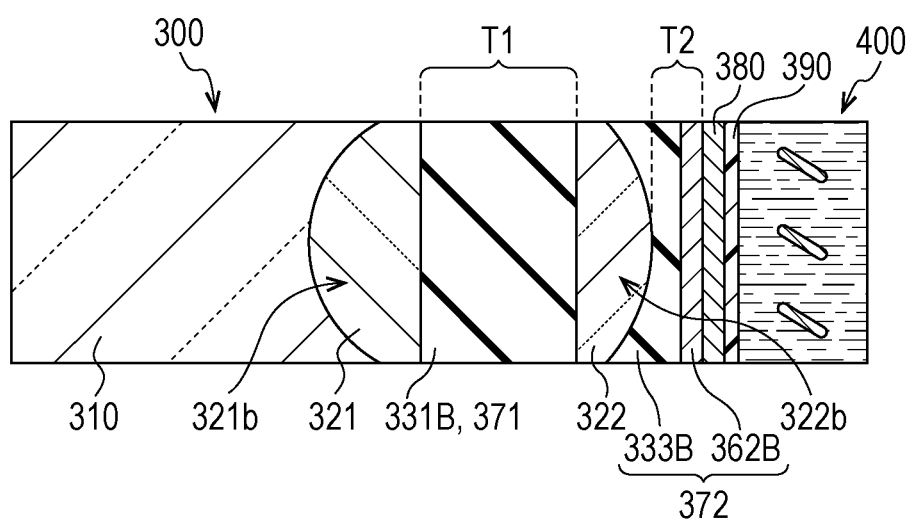
FIG. 13 is a schematic cross-sectional view showing a configuration of one pixel of a counter substrate in a comparative form.

Next, the comparative form will be described. In the comparative form, structures and members different from those of the first embodiment are denoted by adding "B" to their reference numerals. FIG. 13 is a schematic cross-sectional view showing a configuration of one pixel of a counter substrate 300 in the comparative form.

In the comparative form, a compensation member is provided in the counter substrate 300 of the reference form. In general, the smaller a difference between a traveling direction of light incident to the compensation member and a traveling direction of light incident to the liquid crystal layer, the better the compensation of the phase difference is performed. Therefore, it is ideal that a lens layer, which is a member that changes the traveling direction of light, does not exist between the compensation member and the liquid crystal layer. Therefore, in the comparative form, a compensation layer 362B having one layer is arranged closer to the liquid crystal layer 400 than the lens layer 322 arranged close to the liquid crystal layer 400.

More specifically, a laminate of the compensation layer 362B and the insulating layer 333B constitutes the optical path length adjusting layer 372, so that the compensation layer 362B is provided in the optical path length adjusting layer 372. It can be said that this is an aspect in which a part of the thickness of the optical path length adjusting layer 372 composed of the insulating layer 333A in the reference form is replaced by the compensation layer 362B.

The thickness of a compensation member desired to be provided, that is, the thickness of the compensation layer 362B, is assumed to be 1 µm. On the other hand, a preferred thickness of the optical path length adjusting layer 372 is 2.5 µm. Therefore, the thickness of the thinnest portion of the insulating layer 333B is 1.5 µm. However, the insulating layer 333B is difficult to manufacture unless the thickness of the thinnest portion of the insulating layer 333B is 2.0 µm or more. Therefore, in the comparative form, it is difficult to provide the compensation member in the counter substrate 300.

An aspect can be considered where the compensation layer 362B is added while the thickness 2.0 µm of the thinnest portion of the insulating layer 333B is secured. However, in this aspect, the thickness of the optical path length adjusting layer 372 is 3.0 µm, so that the thickness is away from an optimal thickness of 2.5 µm. Therefore, this causes degradation of transmittance.

Next, the first embodiment will be described. In the first embodiment, as shown in FIG. 4, the compensation member 360 is divided into the compensation layer 361 and the compensation layer 362. More specifically, the compensation layer 362 having a thickness of 0.5 µm, which is a difference between the preferred thickness 2.5 µm of the optical path length adjusting layer 372 and 2.5 µm that is desired to be secured as the thickness of the thinnest portion of the insulating layer 333, is arranged in the optical path length adjusting layer 372.

The compensation layer 361 having a thickness of 0.5 µm that is the other thickness of the compensation member 360 is arranged in the optical path length adjusting layer 371 by effectively using a space between the lens layer 321 and the lens layer 322. The optical path length adjusting layer 371 is relatively thick, so that it is easy to maintain a preferred thickness while replacing a part of the thickness with the compensation layer 362.

As described above, according to the first embodiment, the compensation member 360 is divided into the compensation layer 361 and the compensation layer 362, and the compensation layer 361 is arranged between the lens layer 321 and the lens layer 322, so that it is easy to ensure a predetermined thickness or more of the thickness of the thinnest portion of the insulating layer 333B (the flattened insulating layer) included in the optical path length adjusting layer 372 while maintaining preferred thicknesses of the optical path length adjusting layer 371 and the optical path length adjusting layer 372. It is possible to compensate the phase difference by providing the compensation member 360 in the counter substrate 300, and it is also possible to achieve both high transmittance and manufacturing easiness.

The compensation layer 361 has a function to compensate the phase difference and a function to adjust the optical path length by constituting a part of the optical path length adjusting layer 371. Similarly, the compensation layer 362 has a function to compensate the phase difference and a function to adjust the optical path length by constituting a part of the optical path length adjusting layer 372.

The invention is not limited to the embodiment described above. For example, the invention can be applied to other embodiments as described below and can be variously modified. Further, it is possible to appropriately combine one or a plurality of arbitrarily selected other embodiments and modified aspects described below.

For example, the structures and the thicknesses of the optical path length adjusting layer 371 and the optical path length adjusting layer 372 are not limited to the examples described above and may be appropriately changed as needed. Further, for example, the total thickness of the compensation member 360 and the ratio of the thickness of the compensation layer 361 and the thickness of the compensation layer 362 are not limited to the examples described above and may be appropriately changed as needed.

Next, first to third modified examples of the first embodiment will be described. In the first to the third modified examples, the configuration of the counter substrate 300 is different from that of the first embodiment described above. The configurations of the element substrate 200 and the liquid crystal layer 400 (see FIG. 3) may be the same as those of the first embodiment. Also in the first to the third modified examples, in the same manner as in the first embodiment, the phase difference can be compensated by the compensation member 360 and it is also possible to achieve both high transmittance and manufacturing easiness.

First Modified Example of First Embodiment

Figure 5:
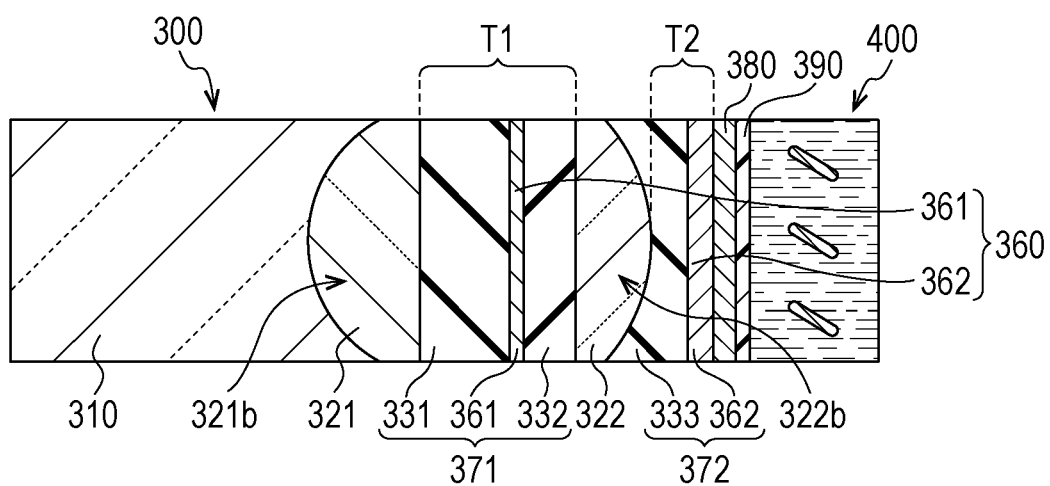
FIG. 5 is a schematic cross-sectional view showing a configuration of one pixel of a counter substrate in a first modified example of the first embodiment.

The first modified example of the first embodiment will be described. FIG. 5 is a schematic cross-sectional view showing a configuration of one pixel of a counter substrate 300 in the first modified example of the first embodiment. The first embodiment described above illustrates a case in which the thickness of the compensation layer 362 provided in the optical path length adjusting layer 372 and the thickness of the compensation layer 361 provided in the optical path length adjusting layer 371 are the same. On the other hand, the present modified example is an aspect in which the compensation layer 362 is thicker than the compensation layer 361. An aspect including the present modified example and the first embodiment described above can be regarded as an aspect in which the thickness of the compensation layer 362 is greater than or equal to the thickness of the compensation layer 361.

No lens layer exists between the compensation layer 362 and the liquid crystal layer 400. Therefore, the compensation layer 362 can easily compensate the phase difference. Hence, an aspect in which the thickness of the compensation layer 362 is greater than or equal to the thickness of the compensation layer 361 is preferable from a viewpoint that the phase difference can be more easily compensated than in a case where the compensation layer 362 is thinner than the thickness of the compensation layer 361.

Second Modified Example of First Embodiment

Figure 6:
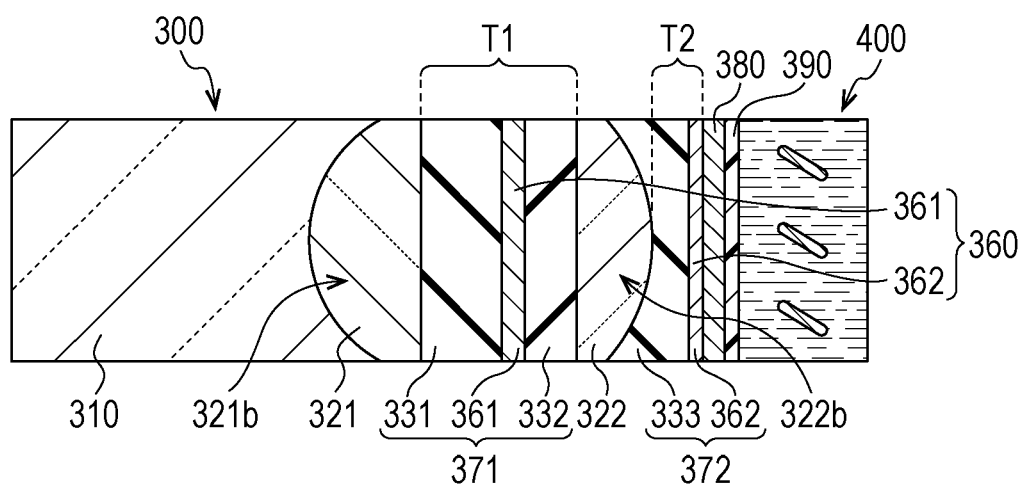
FIG. 6 is a schematic cross-sectional view showing a configuration of one pixel of a counter substrate in a second modified example of the first embodiment.

The second modified example of the first embodiment will be described. FIG. 6 is a schematic cross-sectional view showing a configuration of one pixel of the counter substrate 300 in the second modified example of the first embodiment. The present modified example is an aspect in which the compensation layer 362 provided in the optical path length adjusting layer 372 is thinner than the compensation layer 361 provided in the optical path length adjusting layer 371. An aspect including the present modified example and the first embodiment described above can be regarded as an aspect in which the thickness of the compensation layer 362 is smaller than or equal to the thickness of the compensation layer 361.

The fact that the thickness of the compensation layer 362 is smaller than or equal to the thickness of the compensation layer 361 is more preferable than a case where the compensation layer 362 is thicker than the compensation layer 361 from a viewpoint that the compensation member can be easily provided in the counter substrate 300 even when the preferred thickness of the optical path length adjusting layer 372 is small.

Third Modified Example of First Embodiment

Figure 7:
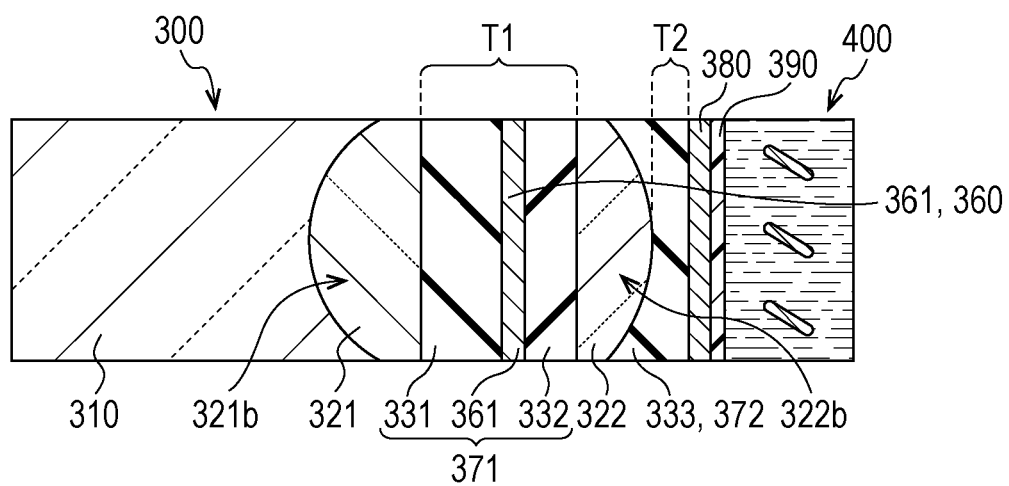
FIG. 7 is a schematic cross-sectional view showing a configuration of one pixel of a counter substrate in a third modified example of the first embodiment.

The third modified example of the first embodiment will be described. FIG. 7 is a schematic cross-sectional view showing a configuration of one pixel of the counter substrate 300 in the third modified example of the first embodiment. The present modified example is an aspect in which the compensation member 360 is composed of the compensation layer 361 provided in the optical path length adjusting layer 371.

When the preferred thickness of the optical path length adjusting layer 372 is reduced to, for example, 2.0 μm, it is difficult to provide the compensation layer 362 in the optical path length adjusting layer 372. In such a case, it is allowed that the compensation layer 361 is provided in the optical path length adjusting layer 371 and the compensation layer 362 is not provided in the optical path length adjusting layer 372 as in the present modified example. In the same manner as the second modified example described above, the present modified embodiment is preferable from a viewpoint that the compensation member can be easily provided in the counter substrate 300 even when the preferred thickness of the optical path length adjusting layer 372 is small.

Next, a second embodiment and first and second modified examples of the second embodiment will be described. In these embodiment and modified examples, the configuration of the counter substrate 300 is different from that of the first embodiment. More specifically, the structure of the optical path length adjusting layer 371 is different from that of the first embodiment. The configurations of the element substrate 200 and the liquid crystal layer 400 (see FIG. 3) may be the same as those of the first embodiment. Also in the second embodiment and the first and the second modified examples of the second embodiment, in the same manner as in the first embodiment, the phase difference can be compensated by the compensation member 360 and it is also possible to achieve both high transmittance and manufacturing easiness.

Second Embodiment

Figure 8:
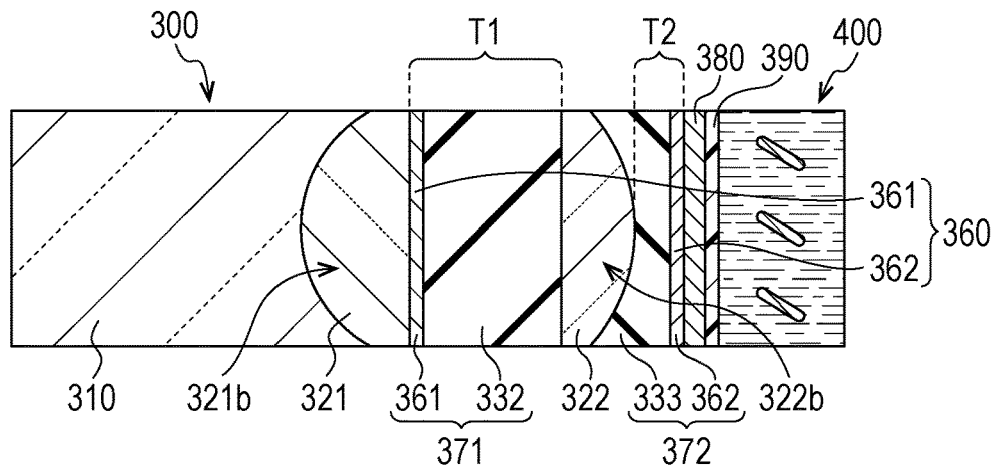
FIG. 8 is a schematic cross-sectional view showing a configuration of one pixel of a counter substrate in a second embodiment.

The second embodiment will be described. FIG. 8 is a schematic cross-sectional view showing a configuration of one pixel of a counter substrate 300 in the second embodiment. In the second embodiment, the optical path length adjusting layer 371 is composed of a laminated layer of the insulating layer 332 and the compensation layer 361, and the compensation layer 361 and the lens layer 321 are in contact with each other. In other words, the insulating layer 331 does not exist between the compensation layer 361 and the lens layer 321.

Thereby, as compared with a case where the insulating layer 331 exists between the compensation layer 361 and the lens layer 321, it is possible to more suppress reflection at an interface between the compensation layer 361 and the insulating layer 331 and reflection at an interface between the insulating layer 331 and the lens layer 322. Further, the process for forming the insulating layer 331 is not required.

A layer of the compensation layer 361, which is in contact with the insulating layer 332, may be a high refractive index layer or may be a low refractive index layer as needed. A layer of the compensation layer 361, which is in contact with the lens layer 321, may be a high refractive index layer or may be a low refractive index layer as needed.

For example, the layer that is in contact with the lens layer 321 may be a low refractive index layer (formed of, for example, silicon oxide) from a viewpoint of improving adhesion with the lens layer 321 (formed of, for example, silicon oxynitride).

Further, for example, the layer that is in contact with the lens layer 321 may be a high refractive index layer. As a comparison object, a case is considered where a layer of the compensation layer 361, which is in contact with the insulating layer 331, is a high refractive index layer in the first embodiment. A refractive index difference at an interface between the compensation layer 361 and the insulating layer 331 is 0.8 when, for example, the refractive index of the high refractive index layer is 2.3 and the refractive index of the insulating layer 331 is 1.5. On the other hand, a refractive index difference at an interface between the compensation layer 361 and the lens layer 321 is 0.7 when, for example, the refractive index of the high refractive index layer is 2.3 and the refractive index of the lens layer 321 is 1.6. The refractive index difference decreases in the second embodiment in this way, so that it is possible to suppress reflection at an interface of the compensation layer 361.

First Modified Example of Second Embodiment

Figure 9:
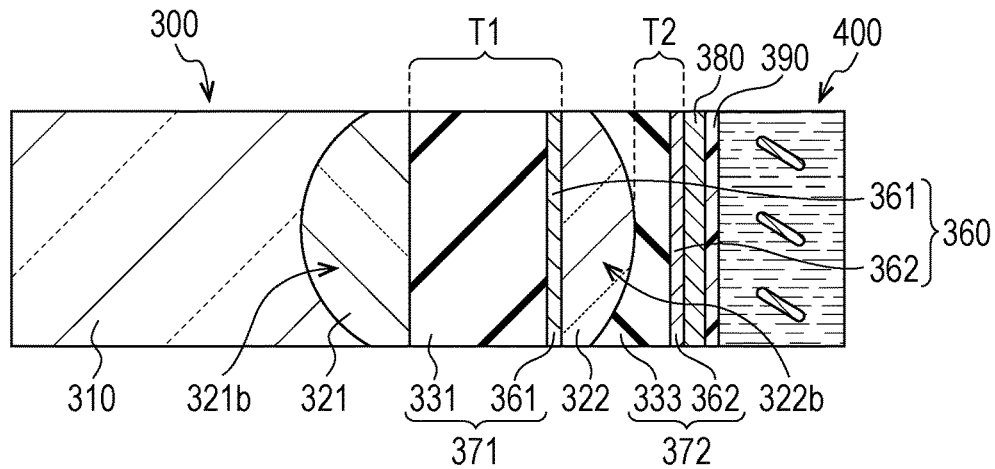
FIG. 9 is a schematic cross-sectional view showing a configuration of one pixel of a counter substrate in a first modified example of the second embodiment.

The first modified example of the second embodiment will be described. FIG. 9 is a schematic cross-sectional view showing a configuration of one pixel of a counter substrate 300 in the first modified example of the second embodiment. In the present modified example, the optical path length adjusting layer 371 is composed of a laminated layer of the compensation layer 361 and the insulating layer 331, and the lens layer 322 and the compensation layer 361 are in contact with each other. In other words, the insulating layer 332 does not exist between the lens layer 322 and the compensation layer 361.

Thereby, as compared with a case where the insulating layer 332 exists between the lens layer 322 and the compensation layer 361, it is possible to more suppress reflection at an interface between the lens layer 322 and the insulating layer 332 and reflection at an interface between the insulating layer 332 and the compensation layer 361. Further, the process for forming the insulating layer 332 is not required.

A layer of the compensation layer 361, which is in contact with the lens layer 322, may be a high refractive index layer or may be a low refractive index layer as needed. A layer of the compensation layer 361, which is in contact with the insulating layer 331, may be a high refractive index layer or may be a low refractive index layer as needed.

For example, the layer that is in contact with the lens layer 322 may be a low refractive index layer (formed of, for example, silicon oxide) from a viewpoint of improving adhesion with the lens layer 322 (formed of, for example, silicon oxynitride).

Further, for example, the layer that is in contact with the lens layer 322 may be a high refractive index layer. As a comparison object, a case is considered where a layer of the compensation layer 361, which is in contact with the insulating layer 332, is a high refractive index layer in the first embodiment. A refractive index difference at an interface between the compensation layer 361 and the insulating layer 332 is 0.8 when, for example, the refractive index of the high refractive index layer is 2.3 and the refractive index of the insulating layer 332 is 1.5. On the other hand, a refractive index difference at an interface between the compensation layer 361 and the lens layer 322 is 0.7 when, for example, the refractive index of the high refractive index layer is 2.3 and the refractive index of the lens layer 322 is 1.6. The refractive index difference decreases in the present modified example in this way, so that it is possible to suppress reflection at an interface of the compensation layer 361.

Second Modified Example of Second Embodiment

Figure 10:
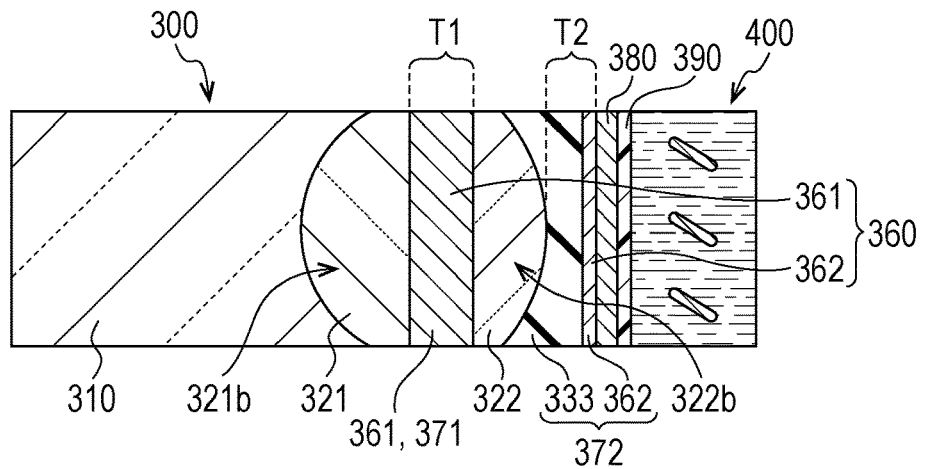
FIG. 10 is a schematic cross-sectional view showing a configuration of one pixel of a counter substrate in a second modified example of the second embodiment.

The second modified example of the second embodiment will be described. FIG. 10 is a schematic cross-sectional view showing a configuration of one pixel of a counter substrate 300 in the second modified example of the second embodiment. In the present modified example, the optical path length adjusting layer 371 is composed of the compensation layer 361, the lens layer 322 and the compensation layer 361 are in contact with each other, and the compensation layer 361 and the lens layer 321 are in contact with each other. In other words, the insulating layer 332 does not exist between the lens layer 322 and the compensation layer 361, and the insulating layer 331 does not exist between the compensation layer 361 and the lens layer 321.

Also in the present modified example, in the same manner as in the second embodiment described above, it is possible to suppress reflection at the interface between the compensation layer 361 and the insulating layer 331 and reflection at the interface between the insulating layer 331 and the lens layer 322, and the process for forming the insulating layer 331 is not required. Further, in the same manner as in the first modified example of the second embodiment described above, it is possible to suppress reflection at the interface between the lens layer 322 and the insulating layer 332 and reflection at the interface between the insulating layer 332 and the compensation layer 361, and the process for forming the insulating layer 332 is not required.

Also in the present modified example, in the same manner as in the second embodiment and the first modified example of the second embodiment described above, a layer of the compensation layer 361, which is in contact with the lens layer 322, may be a high refractive index layer or may be a low refractive index layer as needed. A layer of the compensation layer 361, which is in contact with the lens layer 321, may be a high refractive index layer or may be a low refractive index layer as needed.

When the compensation layer 361 can be provided as the optical path length adjusting layer 371 with a preferred thickness, the optical path length adjusting layer 371 may be composed of the compensation layer 361 as in the present modified example. On the other hand, when it is difficult to equalize a preferred thickness to function as the compensation layer 361 with a preferred thickness to function as the optical path length adjusting layer 371, for example, the optical path length adjusting layer 371 including a laminated layer of the compensation layer 361 and the insulating layer 332 may be formed by providing the insulating layer 332 between the compensation layer 361 and the lens layer 322 as in the first embodiment and the second embodiment, or for example, the optical path length adjusting layer 371 including a laminated layer of the compensation layer 361 and the insulating layer 331 may be formed by providing the insulating layer 331 between the compensation layer 361 and the lens layer 321 as in the first embodiment and the first modified example of the second embodiment. In such an aspect, it is easy to adjust the thickness of the optical path length adjusting layer 371 by adjusting the thickness of the insulating layer 332 or the thickness of the insulating layer 331.

Also in the second embodiment and the first and the second modified examples of the second embodiment, as described in the first to the third modified examples of the first embodiment, the ratio of the thickness of the compensation layer 361 and the thickness of the compensation layer 362 may be appropriately adjusted or the compensation layer 362 need not be provided as necessary.

As described above, at least the compensation layer 361 is arranged between the lens layer 321 and the lens layer 322 as the compensation member 360 in the counter substrate 300 where the lens layer 321 and the lens layer 322 are provided in the thickness direction, so that even when it is difficult to secure a space for arranging a compensation member between the liquid crystal layer 400 and the lens layer 322 (one of the lens layer 321 and the lens layer 322, which is arranged closer to the liquid crystal layer 400), a compensation member can be arranged in the counter substrate 300 and it is possible to compensate a phase difference of light generated by the liquid crystal layer 400.

The insulating layer 331 may be provided between the compensation layer 361 and the lens layer 321 in the thickness direction. It is possible to adjust the thickness of the optical path length adjusting layer 371 (a layer through which light transmits between the lens layer 321 and the lens layer 322) by adjusting the thickness of the insulating layer 331. Similarly, the insulating layer 332 may be provided between the compensation layer 361 and the lens layer 322 in the thickness direction. It is possible to adjust the thickness of the optical path length adjusting layer 371 (a layer through which light transmits between the lens layer 321 and the lens layer 322) by adjusting the thickness of the insulating layer 332.

The compensation layer 361 and the lens layer 321 may be arranged so as to be in contact with each other. The compensation layer 361 and the lens layer 321 are in contact with each other, so that as compared with a case where the insulating layer 331 (another layer) exists between the compensation layer 361 and the lens layer 321, it is possible to more suppress reflection at an interface between the insulating layer 331 (the other layer) and the compensation layer 361 and reflection at an interface between the insulating layer 331 (the other layer) and the lens layer 321. Similarly, the compensation layer 361 and the lens layer 322 may be arranged so as to be in contact with each other. The compensation layer 361 and the lens layer 322 are in contact with each other, so that as compared with a case where the insulating layer 332 (another layer) exists between the compensation layer 361 and the lens layer 322, it is possible to more suppress reflection at an interface between the insulating layer 332 (the other layer) and the compensation layer 361 and reflection at an interface between the insulating layer 332 (the other layer) and the lens layer 322.

When it is easy to secure a space for arranging a compensation member between the liquid crystal layer 400 and the lens layer 322 (one of the lens layer 321 and the lens layer 322, which is arranged closer to the liquid crystal layer 400), the compensation layer 362 is preferably arranged between the liquid crystal layer 400 and the lens layer 322. When the compensation layer 362 is arranged so that the lens layer 321 and the lens layer 322 do not exist between the liquid crystal layer 400 and the compensation layer 362, the phase difference can be easily compensated. From a viewpoint of suppressing drop of voltage applied to the liquid crystal layer 400, it is preferable that the compensation layer 362 does not exist between the common electrode 380 and the liquid crystal layer 400. In other words, the compensation layer 362 is preferably arranged between the common electrode 380 and the lens layer 322.

The thickness of the compensation layer 362 may be greater than or equal to that of the compensation layer 361. According to such an aspect, the phase difference can be more easily compensated as compared with a case where the compensation layer 362 is thinner than the compensation layer 361. Further, the thickness of the compensation layer 362 may be smaller than or equal to that of the compensation layer 361. According to such an aspect, even when it is rather difficult to secure a space for arranging a compensation member between the liquid crystal layer 400 and the lens layer 322, the compensation member can be easily provided in the counter substrate 300.

In the embodiments and the modified examples described above, the C plate is illustrated as the compensation layer 361 and the compensation layer 362 that form the compensation member 360. However, the compensation layer 361 and the compensation layer 362 are not limited to the C plate, and various compensation layers that compensate the phase difference of light generated by the liquid crystal layer 400 may be appropriately selected and used as the compensation layer 361 and the compensation layer 362. Specifically, for example, an O plate, an A plate, and the like may be used in addition to the C plate. Each compensation layer may be arranged not only substantially in parallel with a substrate surface but also inclined with respect to the substrate surface. A structure and a manufacturing method of each compensation layer, publicly known structure and manufacturing method may be appropriately used. The compensation layer 361 and the compensation layer 362 may be mutually different kinds of compensation layers as necessary.

In the embodiments and the modified examples described above, an aspect where the compensation member 360 is composed of two layers, which are the compensation layer 361 and the compensation layer 362, is illustrated. However, the compensation member 360 may be composed of three or more compensation layers as needed.

In the embodiments and the modified examples described above, an aspect where the two lens layers 321 and 322 are provided in the counter substrate 300 is illustrated. However, three or more lens layers may be provided in the counter substrate 300 as needed.

Application Example

Figure 11:
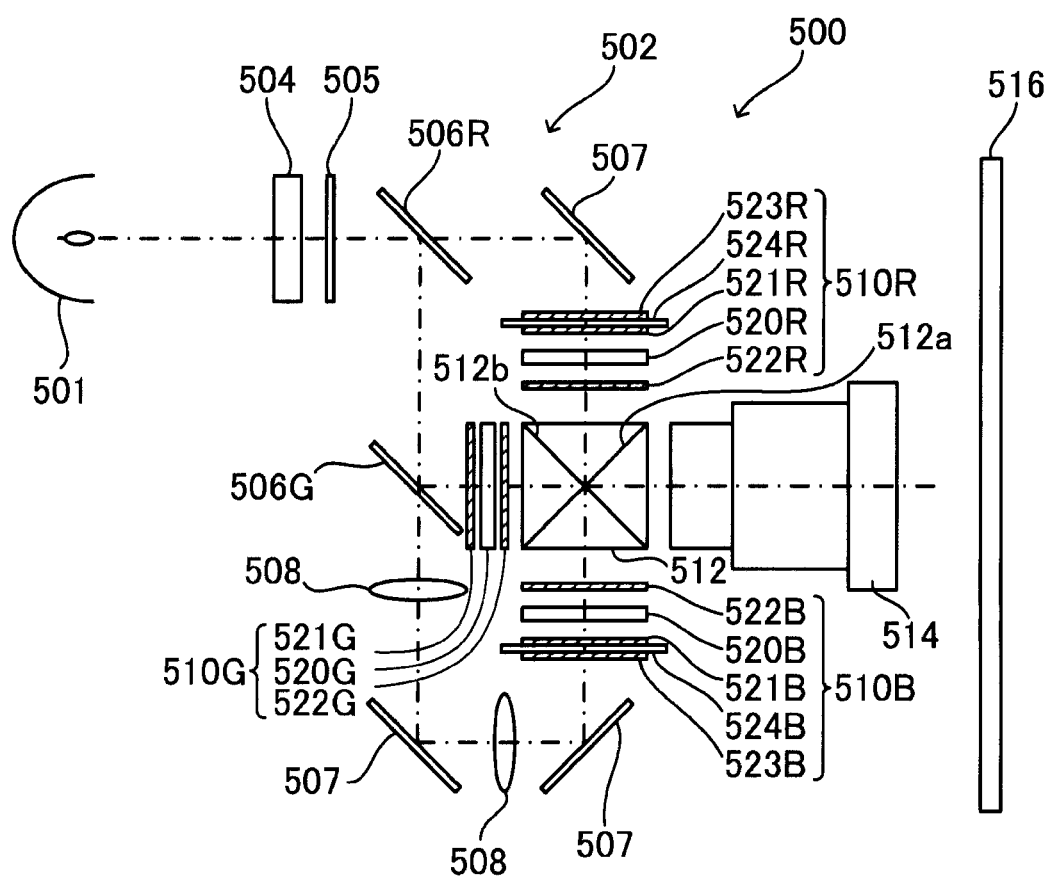
FIG. 11 is a schematic diagram showing an optical system of a projector according to an application example.

Next, as an application example of the embodiments and the modified examples described above, a projection type display device (projector) will be described. FIG. 11 is a schematic diagram showing an optical system of a projector 500 according to the application example. The projector 500 includes a light source device 501, an integrator 504, a polarization conversion element 505, a color separation light guide optical system 502, liquid crystal optical modulation devices 510R, 510G, and 510B as an optical modulation device, a cross dichroic prism 512, and a projection optical system 514. The liquid crystal optical modulation devices 510R, 510G, and 510B are provided with liquid crystal display devices 520R, 520G, and 520B, respectively, as described below. For example, the liquid crystal display device 100 described above can be used as the liquid crystal display devices 520R, 520G, and 520B.

The light source device 501 supplies light including red light (hereinafter referred to as "R light") that is first color light, green light (hereinafter referred to as "G light") that is second color light, and blue light (hereinafter referred to as "B light") that is third color light. For example, an ultra-high-pressure mercury lamp can be used as the light source device 501.

The integrator 504 uniformizes an illuminance distribution of the light emitted from the light source device 501. The light whose illuminance distribution is uniformized is converted by the polarization conversion element 505 into polarized light having a specific oscillating direction, for example, s-polarized light that is s-polarized with respect to a reflection surface of the color separation light guide optical system 502. The light converted into the s-polarized light enters an R light transmitting dichroic mirror 506R constituting the color separation light guide optical system 502.

The color separation light guide optical system 502 includes the R light transmitting dichroic mirror 506R, a B light transmitting dichroic mirror 506G, three reflection mirrors 507, and two relay lenses 508.

The R light transmitting dichroic mirror 506R transmits R light and reflects G light and B light. The R light that transmits the R light transmitting dichroic mirror 506R enters the reflection mirror 507.

The reflection mirror 507 bends an optical path of the R light by 90 degrees. The R light whose optical path is bent enters the R light liquid crystal optical modulation device 510R. The R light liquid crystal optical modulation device 510R is a transmissive liquid crystal device that modulates the R light according to an image signal.

The R light liquid crystal optical modulation device 510R has a $\lambda/2$ phase difference plate 523R, a glass plate 524R, a first polarization plate 521R, a liquid crystal display device 520R, and a second polarization plate 522R. The $\lambda/2$ phase difference plate 523R and the first polarization plate 521R are arranged in a state where the $\lambda/2$ phase difference plate 523R and the first polarization plate 521R are in contact with the light-transmissive glass plate 524R that does not change a polarization direction. In FIG. 11, the second polarization plate 522R is provided independently. However, the second polarization plate 522R may be provided in a state where the second polarization plate 522R is in contact with an emission surface of the liquid crystal display device 520R and an incident surface of the cross dichroic prism 512.

The optical path of the G light and the B light that are reflected by the R light transmitting dichroic mirror 506R is bent by 90 degrees. The G light and the B light whose optical path is bent enter the B light transmitting dichroic mirror 506G. The B light transmitting dichroic mirror 506G reflects the G light and transmits the B light. The G light reflected by the B light transmitting dichroic mirror 506G enters a G light liquid crystal optical modulation device 510G. The G light liquid crystal optical modulation device 510G is a transmissive liquid crystal device that modulates the G light according to the image signal. The G light liquid crystal optical modulation device 510G has a liquid crystal display device 520G, a first polarization plate 521G, and a second polarization plate 522G.

The G light that enters the G light liquid crystal optical modulation device 510G is converted into s-polarized light. The s-polarized light that enters the G light liquid crystal optical modulation device 510G directly transmits through the first polarization plate 521G and enters the liquid crystal display device 520G. Regarding the s-polarized light that enters the liquid crystal display device 520G, the G light is converted into p-polarized light by modulation according to the image signal. The G light that is converted into the p-polarized light by the modulation of the liquid crystal display device 520G is emitted from the second polarization plate 522G. In this way, the G light that is modulated by the G light liquid crystal optical modulation device 510G enters the cross dichroic prism 512.

The B light that transmits through the B light transmitting dichroic mirror 506G enters a B light liquid crystal optical modulation device 510B through two relay lenses 508 and the two reflection mirrors 507.

The B light liquid crystal optical modulation device 510B is a transmissive liquid crystal device that modulates the B light according to the image signal. The B light liquid crystal optical modulation device 510B has a λ/2 phase difference plate 523B, a glass plate 524B, a first polarization plate 521B, a liquid crystal display device 520B, and a second polarization plate 522B.

The B light that will enter the B light liquid crystal optical modulation device 510B is converted into s-polarized light. The s-polarized light that enters the B light liquid crystal optical modulation device 510B is converted into p-polarized light by the λ/2 phase difference plate 523B. The B light that is converted into the p-polarized light directly transmits through the glass plate 524B and the first polarization plate 521B and enters the liquid crystal display device 520B. Regarding the p-polarized light that enters the liquid crystal display device 520B, the B light is converted into s-polarized light by modulation according to the image signal. The B light that is converted into the s-polarized light by the modulation of the liquid crystal display device 520B is emitted from the second polarization plate 522B. The B light that is modulated by the B light liquid crystal optical modulation device 510B enters the cross dichroic prism 512.

In this way, the R light transmitting dichroic mirror 506R and the B light transmitting dichroic mirror 506G included in the color separation light guide optical system 502 separate the light supplied from the light source device 501 into the R light that is the first color light, the G light that is the second color light, and the B light that is the third color light.

The cross dichroic prism 512 that is a color synthesis optical system is configured by orthogonally arranging two dichroic films 512a and 512b in an X shape. The dichroic film 512a reflects the B light and transmits the G light. The dichroic film 512b reflects the R light and transmits the G light. In this way, the cross dichroic prism 512 synthesizes the R light, the G light, and the B light that are modulated by the R light liquid crystal optical modulation device 510R, the G light liquid crystal optical modulation device 510G, and the B light liquid crystal optical modulation device 510B, respectively.

The projection optical system 514 projects the light synthesized by the cross dichroic prism 512 onto a screen 16. Thereby, a full color image can be obtained on the screen 516. In this way, the liquid crystal display device 100 described above can be used for the projector 500 as an example.

The liquid crystal display device 100 described above can be used for a front projection type projector which projects a projection image from an observation side and a rear projection type projector which projects a projection image from an opposite side to the observation side.

An electronic apparatus to which the liquid crystal display device 100 can be applied is not limited to the projector 500. The liquid crystal display device 100 may be used as a display unit of, for example, a projection type HUD (head-up display), a direct-view-type HMD (head-mounted display), an electronic book, a personal computer, a digital still camera, a liquid crystal television set, a viewfinder-type or monitor-direct-viewing-type video recorder, a car navigation system, an electronic notebook, and an information terminal such as POS.

The entire disclosure of Japanese Patent Application No. 2017-120287, filed Jun. 20, 2017 is expressly incorporated by reference herein.

What is claimed is:

1. A liquid crystal display device comprising:
   an element substrate;
   a counter substrate; and
   a liquid crystal layer sandwiched by the element substrate and the counter substrate,
   wherein the counter substrate includes
   a common electrode,
   a first lens layer that collects light incident to the counter substrate,
   a second lens layer that collects the light that transmits through the first lens layer,
   a first phase difference compensation layer that is arranged between the first lens layer and the second lens layer and compensates a phase difference of the light generated by the liquid crystal layer, and
   a second phase difference compensation layer that is arranged between the second lens layer and the liquid crystal layer and compensates a phase difference of the light generated by the liquid crystal layer, and
   a light-transmitting layer that is arranged between the second lens layer and the second phase difference compensation layer and is in direct contact with the second lens layer and the second phase difference compensation layer.

2. The liquid crystal display device according to claim 1, wherein
   the counter substrate includes a first light-transmitting layer arranged between the first phase difference compensation layer and the first lens layer in the thickness direction.

3. The liquid crystal display device according to claim 1, wherein
the counter substrate includes a second light-transmitting layer arranged between the first phase difference compensation layer and the second lens layer in the thickness direction.

4. The liquid crystal display device according to claim 1, wherein
the first phase difference compensation layer is in contact with the first lens layer.

5. The liquid crystal display device according to claim 1, wherein
the first phase difference compensation layer is in contact with the second lens layer.

6. The liquid crystal display device according to claim 1, wherein
a thickness of the second phase difference compensation layer is greater than or equal to a thickness of the first phase difference compensation layer.

7. The liquid crystal display device according to claim 1, wherein
a thickness of the second phase difference compensation layer is smaller than or equal to a thickness of the first phase difference compensation layer.

8. An electronic apparatus comprising:
the liquid crystal display device according to claim 1.

9. An electronic apparatus comprising:
the liquid crystal display device according to claim 2.

10. An electronic apparatus comprising:
the liquid crystal display device according to claim 3.

11. An electronic apparatus comprising:
the liquid crystal display device according to claim 4.

12. An electronic apparatus comprising:
the liquid crystal display device according to claim 5.

13. An electronic apparatus comprising:
the liquid crystal display device according to claim 6.

14. An electronic apparatus comprising:
the liquid crystal display device according to claim 7.

15. The liquid crystal display device according to claim 1, wherein each of the first phase difference compensation layer and the second phase difference compensation layer include a C plate.

16. A liquid crystal display device comprising:
an element substrate;
a counter substrate; and
a liquid crystal layer that is disposed between the element substrate and the counter substrate,
wherein the counter substrate includes
a common electrode,
a first lens layer,
a second lens layer, and
a first phase difference compensation layer that is arranged between the first lens layer and the second lens layer, and
a second phase difference compensation layer that is arranged between the second lens layer and the liquid crystal layer and compensates a phase difference of the light generated by the liquid crystal layer, and
a light-transmitting layer that is arranged between the second lens layer and the second phase difference compensation layer and is in direct contact with the second lens layer and the second phase difference compensation layer.

17. The liquid crystal display device according to claim 16, wherein
the counter substrate includes a first light-transmitting layer arranged between the first phase difference compensation layer and the first lens layer.

18. The liquid crystal display device according to claim 16, wherein
the counter substrate includes a second light-transmitting layer arranged between the first phase difference compensation layer and the second lens layer.

19. The liquid crystal display device according to claim 16, wherein
the first phase difference compensation layer is in contact with the first lens layer.

* * * * *